Figure 1:
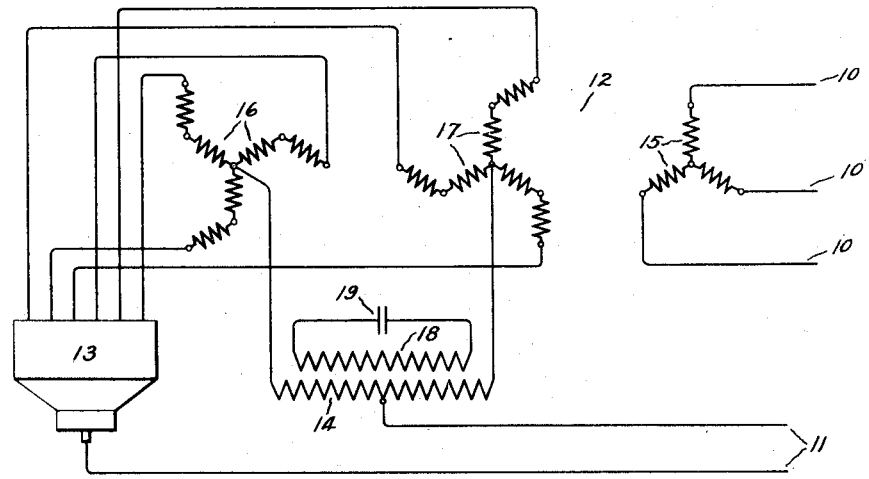

Sept. 6, 1932.    T. C. LENNOX    1,876,428
CONVERTING APPARATUS
Filed Nov. 29, 1929    2 Sheets-Sheet 1

Inventor:
Thomas C. Lennox,
by Charles E. Tullar
His Attorney.

Sept. 6, 1932.  T. C. LENNOX  1,876,428
CONVERTING APPARATUS
Filed Nov. 29, 1929   2 Sheets-Sheet 2

Inventor:
Thomas C. Lennox,
by Charles V. Mullan
His Attorney.

Patented Sept. 6, 1932

1,876,428

UNITED STATES PATENT OFFICE

THOMAS C. LENNOX, OF PITTSFIELD, MASSACHUSETTS, ASSIGNOR TO GENERAL ELECTRIC COMPANY, A CORPORATION OF NEW YORK

CONVERTING APPARATUS

Application filed November 29, 1929. Serial No. 410,441.

My invention relates to the transmission of power between alternating and direct current circuits and has for its principal object the provision of a power converting apparatus and method of operation whereby an improved regulation of the direct current circuit voltage is realized.

Various types of apparatus for transmitting power between alternating and direct current circuits have been provided in the past. One type which has been used to a considerable extent includes a mercury arc rectifier, a transformer provided with a plurality of groups of Y-connected secondary windings each provided with end terminals connected to the anodes of the rectifier and with a neutral terminal, and an interphase transformer connected between the neutral terminals of the different groups, the direct current circuit being connected between the cathode of the rectifier and a terminal intermediate the ends of the interphase transformer. It has been proposed to connect a condenser in parallel with the interphase transformer for the purpose of neutralizing the effect of the exciting current of the interphase transformer and preventing the rise in voltage which tends to occur at very light loads on the direct current circuit. For this purpose a condenser of comparatively small capacity is utilized, no attempt being made to so design the condenser as to affect the regulation of the direct current voltage except at very light loads.

The present invention differs from the previous arrangements in that a condenser connected in shunt relation with the interphase transformer or in circuit with a tertiary of the main transformer is designed to carry current of the order of the full load current of the apparatus. When the condenser is so designed, certain desirable operating charactertistics of the apparatus not possible with the previous arrangements are realized. One of these advantages is an improvement in the power factor of the apparatus. Another is that the direct current voltage may be maintained substantially constant throughout any desired range of direct current loads and may be caused to decrease rapidly when this range of loads is exceeded, the result being that the converting apparatus may be readily made to share the total direct current load with other apparatus without danger of overloading it.

My invention will be bettter understood from the following description when considered in connection with the accompanying drawings and its scope will be pointed out in the appended claims.

Figure 2:
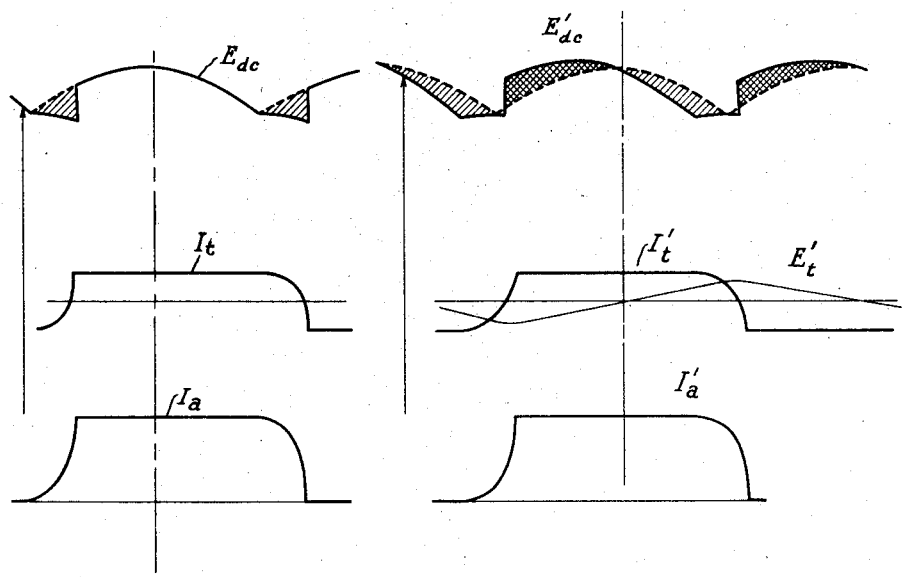
Figure 3:
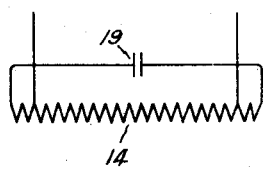
Figure 4:
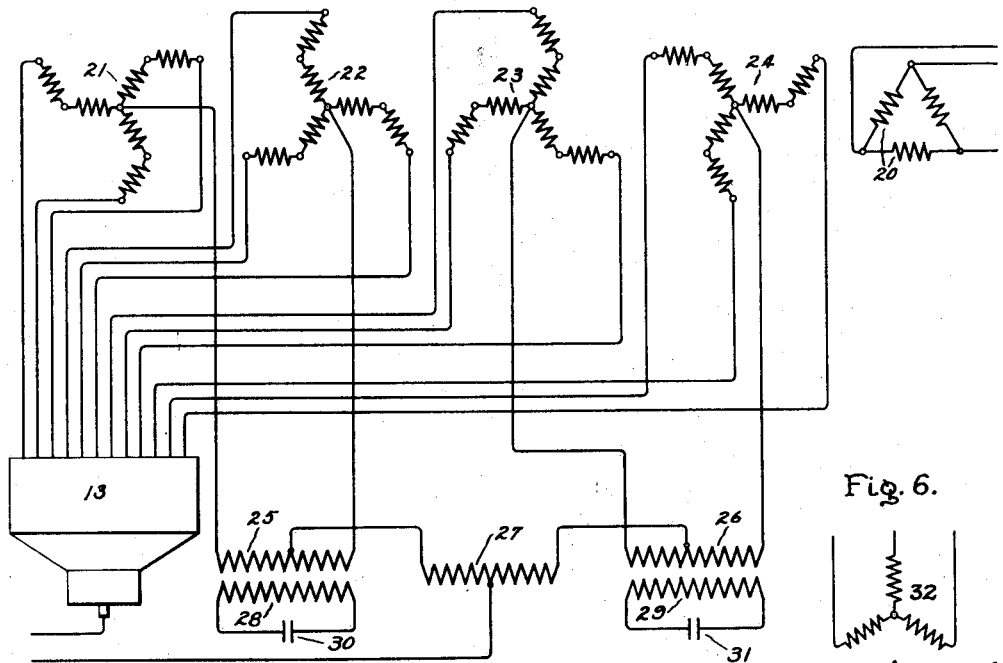
Figure 4:
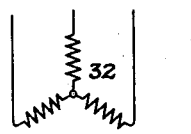
Figure 6:
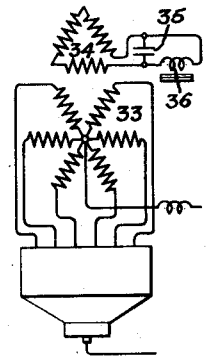

Referring to the drawings, Fig. 1 illustrates a rectifying apparatus wherein my invention has been embodied; Fig. 2 illustrates certain details relating to the operation of the system illustrated by Fig. 1; Fig. 3 illustrates a modified detail in the apparatus; Figs. 4 and 6 illustrate slightly different embodiments of the invention; and Fig. 5 is a set of curves illustrating certain details in the operation of the apparatus illustrated by Figs. 1, 4 and 6.

In the arrangement of Fig. 1, power is transmitted between alternating current terminals 10 and direct current terminals 11 through a main transformer 12, a rectifier 13 and an interphase transformer 14. The transformer 12 is provided with primary windings 15 and with two groups of secondary windings 16 and 17. The interphase transformer is connected between the neutral terminals of the windings 16 and 17 and in the illustrated embodiment of the invention is provided with a secondary circuit which includes a winding 18 and a condenser 19. As indicated by Fig. 3, the condenser 19 may be connected directly in parallel with the interphase transformer winding 14, this winding being extended to apply a somewhat higher voltage to the condenser than exists between the neutral terminals.

In the operation of the apparatus alternating current is supplied to the rectifier 13 through the transformer 12 and the rectified current is supplied to the direct current circuit 11 in a well known manner.

Figure 5:
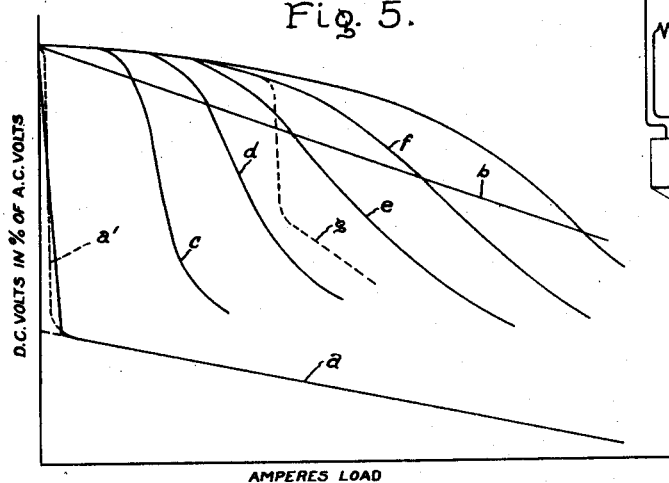

The voltage applied to the direct current circuit 11 in the absence of the interphase transformer is indicated by the curve $b$ of Fig. 5, the load current being plotted against the direct current voltage expressed in percentage of alternating current voltage. The voltage applied to the direct current circuit with the interphase transformer connected between the neutrals and without the condenser 19 is indicated by the curve $a$ of Fig. 5. As is well understood, the curve $b$ illustrates the direct current voltage existing when the apparatus is operating straight 6 phase and the curve $a$ illustrates the direct current voltage existing when the apparatus is operating double 3 phase. By placing in parallel with the interphase transformer a condenser which is capable of carrying a current much smaller than the load capacity of the apparatus, as heretofore proposed for neutralizing the effect of the exciting current of the interphase transformer and preventing the rise in voltage of the direct current circuit at light loads, the point at which this voltage begins to rise is shifted to the left as indicated by the broken line $a'$. In the prior arrangements, however, it was not contemplated that the capacity of the condenser be designed to carry current of the order of the full load current of the apparatus.

The effect of so designing the condenser is illustrated by the curves $c, d, e, f$ which indicate the direct current voltage characteristics obtained for different values of capacitance connected in shunt relation with the interphase transformer. As indicated by these curves, the direct current voltage is substantially constant throughout a predetermined load range and decreases rapidly thereafter. This characteristic has the marked advantage that loading of the rectifier beyond a predetermined point is prevented by decrease in the direct current voltage.

As indicated by the dotted curve $g$, this effect may be accentuated if the capacitance of the condenser and the inductance of the interphase transformer are so related that the circuit formed by the interphase transformer becomes resonant at a predetermined direct current load. This resonant condition may be brought about by so designing the interphase transformer that it saturates in a manner to produce the necessary inductance in parallel with the condenser when the given direct current load has been attained.

The effect of the condenser 19 is indicated by the curves of Fig. 2 wherein the curves $I_a$, $I_t$, and $E_{dc}$ respectively represent the anode current, the current of the interphase transformer and the voltage of the direct current circuit during one-half cycle of the primary alternating current when the condenser 19 is short circuited. As indicated by the shaded area, the direct current voltage is decreased at the beginning of the half cycle due to the voltage consumed in the commutation of the current between successive anodes. As a result, the anode current is caused to lag behind the anode voltage and the power factor of the apparatus is correspondingly decreased.

The conditions existing when the condenser 19 is designed to carry a current of the order of the load current of the apparatus is indicated by the curves $I'_a$, $I'_t$, and $E'_{dc}$. It will be observed that the effect of the condenser is to raise the direct current voltage at the beginning of the time corresponding to a half cycle of the primary alternating current and to decrease the voltage at the end of this half cycle. As a result of this increase and decrease, commutation takes place sooner, the anode current of the rectifier is advanced and the power factor of the current drawn from the alternating circuit is improved. The triple frequency voltage of the interphase transformer is indicated by the curve $E'_t$. Due to the arrangement of the main transformer windings, this triple frequency current is not reflected into the primary circuit.

The apparatus illustrated by Fig. 4 is similar to that illustrated by Fig. 1 but differs therefrom in that a larger number of anodes are provided, thereby necessitating that the number of phases in the secondary winding of the transformer be increased. The transformer is provided with delta-connected primary windings 20 and with four groups of secondary windings 21, 22, 23 and 24 each of which is arranged in a staggered Y-connection. The end terminals of these secondary windings are connected to the different anodes of the rectifier. The neutral terminals of the Y-connected groups 21 and 22 are interconnected through an interphase transformer winding 25, the neutral terminals of the Y-connected groups 23 and 24 are interconnected through an interphase transformer winding 26, and the windings 25 and 26 are interconnected at points intermediate their ends through a winding 27, one side of the direct current line being connected to a point intermediate the ends of the winding 27. Windings 25 and 26 are associated with secondary windings 28 and 29 respectively, a condenser 30 being connected across the terminals of the winding 28 and a condenser 31 being connected across the terminals of the winding 29.

The operation of this apparatus is substantially the same as that illustrated by Fig. 1 and will be understood without further explanation. In either case undesirable decrease in the power factor of the apparatus is obviated and the direct current voltage is so regulated so as to be substantially constant throughout the desired range of loads on the direct current circuit.

A similar result may be produced by a tertiary winding which is connected with a condenser and an inductance in a delta circuit. Such an arrangement is illustrated by Fig. 6. This figure illustrates a transformer provided with a primary winding 32, a secondary winding 33 and a tertiary winding 34. The tertiary winding 34 is arranged to have a condenser 35 and an inductance 36 connected in series with it. In this arrangement the condenser is designed to carry the current of the same order as the full load current of the apparatus and the inductance functions in substantially the same manner as the interphase transformers shown in Figs. 1, 3 and 4. This arrangement gives substantially the same results as the previously described arrangements, the triple frequency voltage from the condenser appearing from line to neutral in the transformer windings.

While I have shown and described my invention with reference to rectifying or the like apparatus of the vapor arc type and particularly to apparatus of the mercury arc type it will be understood that I do not wish to be limited thereto, since any other suitable type of electric discharge apparatus in which current is caused to flow unidirectionally between a negative conductor and a plurality of anodes, for rectifying or like purposes, may be employed. Thus while I have shown only two embodiments of my invention it will be understood that many modifications may be made therein and that I contemplate by the appended claims to cover any such modification as falls within the true spirit and scope of my invention.

What I claim as new and desire to secure by Letters Patent of the United States is:

1. The combination of a transformer provided with a plurality of groups of secondary windings, an interphase transformer connected between the neutral terminals of said groups, a rectifier connected to the end terminals of said groups, and a condenser connected in shunt relation to said interphase transformer, said condenser being designed to carry a current of the order of the full load current of said transformer.

2. A power converting apparatus including a transformer provided with a plurality of polyphase secondary windings each including end and neutral terminals, rectifying means provided with a plurality of anodes connected to said end terminals, a plurality of interphase transformer windings connected between the neutral terminals of different secondary windings, and a condenser connected in shunt relation with each of said interphase transformer windings.

3. A power converting apparatus including a transformer provided with a plurality of groups of secondary windings each including end and neutral terminals, a rectifier provided with a plurality of anodes connected to said end terminals, a plurality of interphase transformer windings connected between the neutral terminals of different groups of said secondary windings, a condenser connected in shunt relation with each of said interphase transformer windings, and a winding connected to said interphase transformer windings at points intermediate their ends.

4. The combination of alternating and direct current circuits, means comprising a rectifier and a transformer provided with primary and secondary windings to transmit power between said circuits, said direct current circuit being interconnected with said secondary windings and said rectifier, a condenser designed to carry a current of the same order of magnitude as the full load current of said transformer, and an inductance device arranged to impress on said condenser from said transformer a voltage of a frequency which is a multiple of the frequency of the voltage impressed on said transformer, whereby the voltage of said direct current circuit may be made to have a substantially constant value throughout a predetermined range of loads.

5. The combination of alternating and direct current terminals, a transformer provided with a plurality of groups of secondary windings, an interphase transformer connected between the neutral terminals of said groups, a device having a cathode and a plurality of anodes to transmit power between said alternating and direct current terminals, said device being connected to the end terminals of said groups, and a condenser connected in shunt relation to said interphase transformer, said condenser being designed to carry a current of the order of the full load current of said transformer.

6. A power converting apparatus including alternating and direct current terminals, a transformer provided with a plurality of polyphase secondary windings each including end and neutral terminals, a device having a cathode and a plurality of anodes to transmit power between said alternating and direct current terminals, said anodes being connected to said end terminals, a plurality of interphase transformer windings connected between the neutral terminals of different secondary windings, and a condenser connected in shunt relation with each of said interphase transformer windings.

7. A power converting apparatus including alternating and direct current terminals, a transformer provided with a plurality of groups of secondary windings each including end and neutral terminals, a device having a cathode and a plurality of anodes to transmit power between said alternating and direct current terminals, said anodes being connected to said end terminals, a plurality of interphase transformer windings connected between the neutral terminals of different groups of said secondary windings, a condenser connected in shunt relation with each of said interphase transformer windings, and a winding connected to said interphase transformer windings at points intermediate their ends.

8. The combination of alternating and direct current circuits, means to transmit power between said circuits comprising a transformer provided with primary and secondary windings and a device having a cathode and having a plurality of anodes connected to said secondary windings, said direct current circuit being interconnected with said secondary windings and said cathode, a condenser designed to carry a current of the same order of magnitude as the full load current of said transformer, and an inductance device arranged to impress on said condenser from said transformer a voltage of a frequency which is a multiple of the frequency of the voltage impressed on said transformer.

9. The combination of alternating and direct current circuits, means to transmit power between said circuits comprising a transformer provided with primary and secondary windings and a device having a cathode and having a plurality of anodes connected to said secondary windings, said direct current circuit being interconnected with said secondary windings and said cathode, a condenser designed to carry a current of the same order of magnitude as the full load current of said transformer, an inductance device arranged to impress on said condenser from said transformer a voltage of a frequency which is a multiple of the frequency of the voltage impressed on said transformer, and an inductance connected in parallel with said condenser.

In witness whereof, I have hereunto set my hand this 26th day of November, 1929.

THOMAS C. LENNOX.